US012216697B2

United States Patent
Huang

(10) Patent No.: US 12,216,697 B2
(45) Date of Patent: Feb. 4, 2025

(54) EVENT DETECTION

(71) Applicant: Alipay (Hangzhou) Information Technology Co., Ltd., Zhejiang (CN)

(72) Inventor: Weipeng Huang, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/395,120

(22) Filed: Dec. 22, 2023

(65) Prior Publication Data

US 2024/0143644 A1     May 2, 2024

Related U.S. Application Data

(63) Continuation of application No. PCT/CN2022/109834, filed on Aug. 3, 2022.

(30) Foreign Application Priority Data

Sep. 14, 2021 (CN) .......................... 202111075599.1

(51) Int. Cl.
    *G06F 16/00*     (2019.01)
    *G06F 16/36*     (2019.01)
    *G06F 40/40*     (2020.01)

(52) U.S. Cl.
    CPC .......... *G06F 16/358* (2019.01); *G06F 16/367* (2019.01); *G06F 40/40* (2020.01)

(58) Field of Classification Search
    CPC .............................. G06F 16/358; G06F 16/367
    See application file for complete search history.

(56) References Cited

U.S. PATENT DOCUMENTS

| | | | |
|---|---|---|---|
| 7,505,989 B2 * | 3/2009 | Gardner | ................ G06F 16/367 |
| | | | 707/999.102 |
| 11,468,386 B2 * | 10/2022 | Beaumont | ............. G06F 21/552 |
| 11,521,022 B2 * | 12/2022 | Brewington | ........ G06F 18/2193 |
| 11,556,579 B1 * | 1/2023 | Bhatia | .................... G06F 16/367 |
| 11,868,380 B1 * | 1/2024 | Pavlopoulou | ........... G06F 17/16 |
| 11,978,438 B1 * | 5/2024 | Ramakrishna | ...... G10L 15/1815 |

(Continued)

FOREIGN PATENT DOCUMENTS

| | | |
|---|---|---|
| CN | 110968700 A | 4/2020 |
| CN | 111177315 A | 5/2020 |

(Continued)

*Primary Examiner* — Noosha Arjomandi
(74) *Attorney, Agent, or Firm* — Seed IP Law Group LLP

(57) ABSTRACT

This specification discloses an event detection method and system. The method includes: obtaining a to-be-processed text; extracting one or more groups of instance data from the to-be-processed text by using an extraction model; determining one or more extracted triplets based on the one or more groups of instance data, to obtain an extracted graph; obtaining graph ontology definition data of one or more candidate events, and obtaining an ontology definition graph corresponding to each candidate event based on the graph ontology definition data; determining a similarity between the extracted graph and each ontology definition graph of the one or more candidate events; and determining an event corresponding to the to-be-processed text from the one or more candidate events based on each similarity.

20 Claims, 4 Drawing Sheets

(56) References Cited

U.S. PATENT DOCUMENTS

| | | | |
|---|---|---|---|
| 2009/0106105 A1* | 4/2009 | Lewis | G06Q 30/0273 705/14.69 |
| 2012/0136863 A1* | 5/2012 | Bobick | G06N 5/022 707/E17.014 |
| 2013/0138696 A1* | 5/2013 | Turdakov | G06F 16/367 707/794 |
| 2017/0337268 A1* | 11/2017 | Ait-Mokhtar | G06F 16/3344 |
| 2018/0082183 A1 | 3/2018 | Hertz et al. | |
| 2018/0232443 A1* | 8/2018 | Delgo | G06F 16/35 |
| 2019/0197446 A1* | 6/2019 | Bhattacharjya | G06F 16/3344 |
| 2019/0278777 A1* | 9/2019 | Malik | G06F 16/9024 |
| 2021/0295822 A1* | 9/2021 | Tomkins | G06F 16/3338 |
| 2022/0148286 A1* | 5/2022 | Keshwani | G06V 10/82 |
| 2022/0292525 A1* | 9/2022 | Ash | G06Q 10/06315 |
| 2022/0300544 A1* | 9/2022 | Potter | G06N 3/088 |
| 2022/0318522 A1* | 10/2022 | Wolf | G06N 3/044 |
| 2023/0039937 A1* | 2/2023 | Wendell | G16H 15/00 |
| 2023/0102002 A1* | 3/2023 | Garapati | H04L 41/0636 709/223 |
| 2023/0102786 A1* | 3/2023 | Garapati | G06N 20/20 706/50 |
| 2023/0136939 A1* | 5/2023 | Kanzelberger | G06N 20/10 706/47 |
| 2023/0162613 A1* | 5/2023 | Asgekar | G09B 7/00 434/350 |
| 2023/0199746 A1* | 6/2023 | Vannithamby | G06N 7/01 370/452 |
| 2023/0207138 A1* | 6/2023 | Schein | G16H 50/70 705/2 |
| 2023/0232052 A1* | 7/2023 | Khavronin | H04N 21/251 709/219 |
| 2023/0326224 A1* | 10/2023 | Agarwal | G06V 30/414 |
| 2023/0344839 A1* | 10/2023 | Miserendino | H04L 63/1433 |
| 2024/0143644 A1* | 5/2024 | Huang | G06F 40/30 |
| 2024/0193400 A1* | 6/2024 | Varghese | G06F 40/20 |

FOREIGN PATENT DOCUMENTS

| | | |
|---|---|---|
| CN | 113191497 A | 7/2021 |
| CN | 113779358 A | 12/2021 |

* cited by examiner

EVENT DETECTION

TECHNICAL FIELD

This specification relates to the field of natural language processing, and in particular, to an event detection through natural language processing.

BACKGROUND

Event detection or event extraction is an important application of an artificial intelligence technology, and a people-concerned event can be efficiently obtained from massive data. For example, a target risk event is extracted from a large amount of news and reports in the financial field, to help an investor avoid an investment risk effectively. However, as a new event occurs, an existing event detection or extraction algorithm may also need to be updated for the new event, to increase technology updating or upgrading costs.

SUMMARY

The specification provides an event detection method and system, by which a known event can be effectively identified from massive data, and which can be compatible with new events at relatively low costs.

An aspect of this specification provides an event detection method. The method includes: obtaining a to-be-processed text; extracting one or more groups of instance data from the to-be-processed text by using an extraction model, where each group of instance data includes a first entity instance, a first entity type corresponding to the first entity instance, a second entity instance, a second entity type corresponding to the second entity instance, and a relationship description between the first entity type and the second entity type; determining one or more extracted triplets based on the one or more groups of instance data, to obtain an extracted graph, where the extracted triplet includes the first entity type, the second entity type, and the relationship description between the first entity type and the second entity type in the instance data; obtaining graph ontology definition data of one or more candidate events, and obtaining an ontology definition graph corresponding to each candidate event based on the graph ontology definition data, where the graph ontology definition data of the one or more events includes an entity type used to indicate an entity and a relationship description used to indicate a relationship between entity types; determining a similarity between the extracted graph and each ontology definition graph of the one or more candidate events; and determining an event corresponding to the to-be-processed text from the one or more candidate events based on each similarity.

An aspect of this specification provides an event detection system. The system includes: a text acquisition module, configured to obtain a to-be-processed text; an extraction module, configured to extract one or more groups of instance data from the to-be-processed text by using an extraction model, where each group of instance data includes a first entity instance, a first entity type corresponding to the first entity instance, a second entity instance, a second entity type corresponding to the second entity instance, and a relationship description between the first entity type and the second entity type; an extracted graph acquisition module, configured to determine one or more extracted triplets based on the one or more groups of instance data, to obtain an extracted graph, where the extracted triplet includes the first entity type, the second entity type, and the relationship description between the first entity type and the second entity type in the instance data; an ontology definition graph acquisition module, configured to: obtain graph ontology definition data of one or more candidate events, and obtain an ontology definition graph corresponding to each candidate event based on the graph ontology definition data, where the graph ontology definition data of the one or more events includes an entity type used to indicate an entity and a relationship description used to indicate a relationship between entity types; a similarity determining module, configured to determine a similarity between the extracted graph and each ontology definition graph of the one or more candidate events; and an event determining module, configured to determine an event corresponding to the to-be-processed text from the one or more candidate events based on each similarity.

An aspect of this specification provides a computer-readable storage medium. The storage medium stores computer instructions, and in response to that the computer instructions are executed by a processor, an event detection method is implemented.

An aspect of this specification provides an event detection apparatus. The apparatus includes at least one processor and at least one memory, the at least one memory is configured to store computer instructions, and the at least one processor is configured to execute at least some instructions in the computer instructions, to implement an event detection method.

BRIEF DESCRIPTION OF DRAWINGS

This specification is further described by using example implementations, and theses example implementations are described in detail with reference to the accompanying drawings. These implementations are not intended for limitation. In these implementations, same numbers represent same structures.

DESCRIPTION OF EMBODIMENTS

Figure 1:
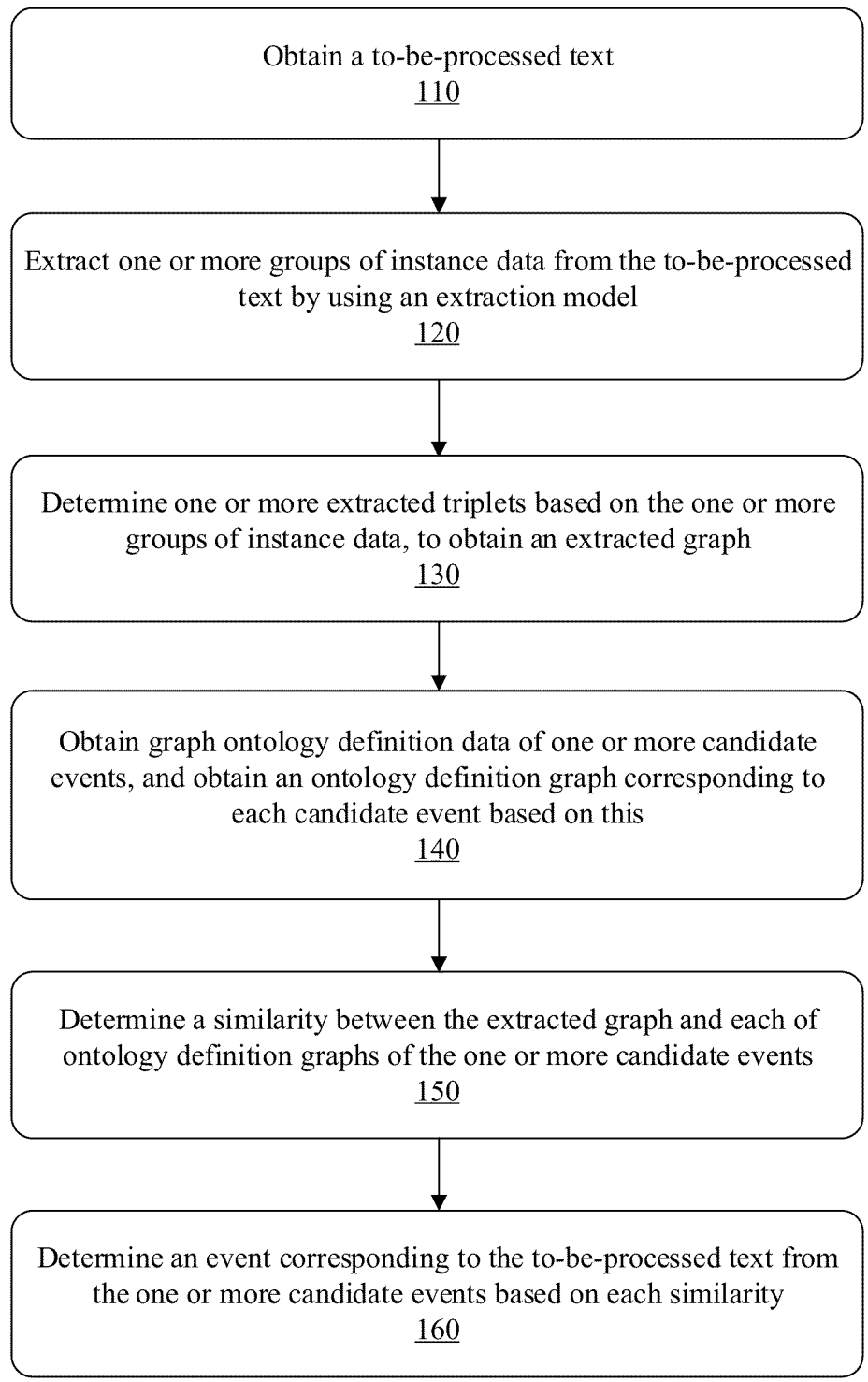
FIG. 1 is an example flowchart illustrating an event detection method according to some implementations of this specification.

To describe the technical solutions in the implementations of this specification more clearly, the following is a brief introduction of the accompanying drawings for illustrating such technical solutions. Clearly, the accompanying drawings described herein are some examples of implementations of this specification, and a person of ordinary skill in the art can further apply this specification to other similar scenarios based on these accompanying drawings without making innovative efforts. Unless clearly learned from the language environment or otherwise stated, same numbers in the drawings represent same structures or operations.

It should be understood that "system", "apparatus", "unit", and/or "module" used in this specification are/is a method used to distinguish between different components, elements, devices, parts, or assemblies of different levels. However, in response to that other words can achieve the same purpose, the words can be replaced by other expressions.

As shown in this specification and the claims, unless an exception is explicitly indicated in the context, the words "one", "a", "an", and/or "the" do not, for example, indicate singular numbers and can also include plural numbers. Generally, the terms "include" and "comprise" only indicate steps and elements that have been explicitly identified, and these steps and elements do not constitute an exclusive listing, and the method or the device can also include other steps or elements.

A flowchart is used in the specification to describe operations performed by a system according to the implementations of the specification. It should be understood that a previous or a subsequent operation is not necessarily performed precisely in a sequence. Instead, steps may be processed in a reverse sequence or processed simultaneously. In addition, other operations may be added to these processes, or a step or several operations may be removed from these processes.

In an era of information burst, a large amount of information appears every day, and information expression forms are flexible and changeable. Therefore, how to make an existing event detection solution better compatible with new event detection is a problem worthy of study. In some implementations, text data can be processed by using an event detection model, to detect and/or extract an event from a text, thereby helping a user to quickly select information of interest. For example, the event detection model can detect an event "Company A loses the lawsuit to Company B" from a news report "Company A sues Company B, and a first instance decides Company A loses". However, the event detection model is limited to a training corpus. In response to that a new event occurs, because the event detection model does not "see" a keyword or trigger word of the new event, it is difficult for the event detection model to identify the new event from data such as a news report. For this reason, a solution is to continuously collect new training corpus, continue to train the event detection model, and improve the detection capability of the event detection model. However, collecting new training corpus or retraining the model consumes more manpower and time costs.

Some implementations of this specification provide an event detection solution. In the event detection solution, an event or an event element is detected based on event graph ontology definition data. The event graph ontology definition data mainly includes an entity type and a general description of a relationship between entity types. Therefore, to a certain extent, for at least a newly emerging event in the same field, the new event can be effectively detected only by indicating event graph ontology definition data for the new event, which greatly reduces technology upgrading or updating costs.

FIG. 1 is an example flowchart illustrating an event detection method according to some implementations of this specification. In some implementations, a process 100 can be performed by a processing device or implemented by an event detection system disposed on the processing device. The event detection system can include a text acquisition module, an extraction module, an extracted graph acquisition module, an ontology definition graph acquisition module, a similarity determining module, and an event determining module.

As shown in FIG. 1, an event detection method 100 can include following steps.

Step 110: Obtain a to-be-processed text.

For example, step 110 can be performed by a text acquisition module.

The to-be-processed text is a text from which an event needs to be detected. In some implementations, the to-be-processed text can be a chapter-level text, for example, news, a paper, a research report, and a running comment. In some implementations, a to-be-identified text can be a sentence-level text, for example, a statement included in any of the above chapter-level texts. For example, the to-be-processed text can be a news text in Chinese "A 公司的股权被冻结，120 亿新 能源投资何以为继？..." (in English "with share ownership of Company A being frozen, how to continue the 12 billion investment in new energy?...").

In some implementations, the text acquisition module can directly obtain the to-be-processed text from information in a text form. For example, the text acquisition module can obtain the to-be-processed text from a text database. For another example, the text acquisition module can further crawl the to-be-processed text from a web page text.

In some implementations, the text acquisition module can further obtain the to-be-processed text from a picture message based on a character recognition technology. In some implementations, the to-be-processed text can be further obtained from voice information based on an automatic speech recognition (ASR) technology.

In some implementations, the to-be-processed text can include a plurality of words or phrases such as a Chinese character, a Japanese character, or an English word.

Step 120: Extract one or more groups of instance data from the to-be-processed text by using an extraction model.

For example, step 120 can be performed by the extraction module.

The instance data includes an entity type, an entity instance (that is, a data instance corresponding to an entity), and a relationship description between entity types in the to-be-processed text.

The entity type is an extensive abstraction of an objective individual and a behavior. The entity type can be a tangible object in a physical world, for example, a person, a law enforcement agency, or a corporate entity; or can be an invisible object, for example, a discourse, a song, a movie, an asset, or an involved amount; or can be a behavior action, for example, a management verb, a verb of a punitive action, or a verb of a preservation action. The entity instance can be an example that actually exists in a case of an abstraction concept of the entity type. For example, the corporate entity can be, for example, Company A, Company B, or Company C, the asset can be, for example, a real estate, a shareholding of 20 billion yuan, or a cash of 100 thousands yuan, and the verb of a preservation action can be, for example, "attach", "freeze", and "seize". For example, an entity instance in Chinese "公司的股权被冻结，120 亿新能源投资何以为继？..." (in English "with share ownership of Company A being frozen, how to continue the 12 billion investment in new energy?...") in the to-be-processed text includes: "A 公司" (in English "Company A"), "股权" (in English "share ownership"), "冻结" (in English "frozen"), and the like, and a corresponding entity type includes the corporate entity, the asset, the verb of a preservation action, and the like.

There can be a relationship between entity instances, and the relationship between entity instances can be indicated by using a relationship description between entity types corresponding to the entity instances. For example, a relationship between an entity type of an asset and an entity type of a corporate entity is "belong", and a relationship between an entity type of a verb of a punitive action and an entity type of an asset can be "action object". Further, there can be a corresponding relationship description between entity instances. In the to-be-processed text, "share ownership" belongs to "Company A", an action object of "frozen" is "share ownership", and the like.

In some implementations, a more abstract and widely applicable relationship description can be indicated. For example, the relationship description can include a verb-object relationship, a subject-verb relationship, an attribute-object relationship, and a modifying relationship. In response to that a first entity type is a verb-type entity and a second entity type is a noun-type entity, a relationship description between the first entity type and the second entity type can be a verb-object relationship (VOB). For example, a relationship description between a first entity type "a verb of a preservation action" and a second entity type "an asset" is a verb-object relationship. In response to that the first entity type is a noun type and the second entity type is a verb type, the relationship description can be a subject-verb relationship (SBV). For example, a relationship description between a first entity type "law enforcement agency" and a second entity type "a verb of a punitive action" is a subject-verb relationship. In response to that the first entity type is a modifier such as a possession, a range, a material, a form, a property, a number, usage, time, or a position, and the second entity type is an object word, the relationship description can be an attribute-object relationship (Attribute, ATT). For example, a relationship description between a first entity type "corporate entity" and a second entity type "an asset" is an attribute-object relationship. In response to that the first entity type is a modified word and the second entity type is a modifier, the relationship description can be a modifying relationship (Modify, MOD). For example, a relationship description between a first entity type "an asset" and a second entity type "involved amount" is a modifying relationship.

In some implementations, each group of instance data can include a first entity instance, a first entity type, a second entity instance, a second entity type, and a relationship description between the first entity type and the second entity type.

Still using the above example, in the first group of instance data, a first entity instance can be "股权" (in English "share ownership"), and a corresponding second entity instance can be "冻结" (in English "frozen"). The first entity type and the second entity type are respectively extensive abstractions corresponding to the first entity instance and the second entity instance. For example, in the first group of instance data, a first entity type corresponding to the first entity instance "股权" (in English "share ownership") is an asset, and a second entity type corresponding to the second entity instance "冻结" (in English "frozen") is a verb of a preservation action. A relationship description between the second entity type "a verb of a preservation action" corresponding to the second entity instance "冻结" (in English "frozen") and the first entity type "an asset" corresponding to the first entity instance "股权" (in English "share ownership") is a verb-object relationship. The first group of instance data can be represented as [verb of preservation action: 冻结, VOB, asset: 股权] (in English "[verb of preservation action: frozen, VOB, asset: share ownership]").

In some implementations, the extraction module can extract a plurality of groups of instance data from the to-be-processed text.

It can be understood that a relationship between the first entity instance and the second entity instance is relative. In some implementations, the first entity instance and the second entity instance can be exchanged, and then are used as a new group of instance data. The above example is continued. In the second group of instance data, the first entity instance can be the second entity instance "股权" (in English "share ownership") in the first group of instance data, and the second entity instance is the first entity instance "冻结" (in English "frozen") in the first group of instance data. A corresponding first entity type and a corresponding second entity type are respectively "an asset" and "a verb of a preservation action". Correspondingly, a relationship description between the two entity types changes correspondingly. For example, in the second group of instance data, the relationship description between the first entity type "an asset" and the second entity type "a verb of a preservation action" is a subject-verb relationship. The second group of instance data can be represented as [Asset: 股权, SBV, verb of a preservation action: 冻结] (in English "[Asset: share ownership, SBV, verb of a preservation action: frozen]").

In some implementations, entity instances and relationship descriptions of a plurality of groups of instance data can be partially the same. The above example is continued. The third group of instance data can be [asset: 股权, MOD, involved amount: 120 亿] (in English "[asset: share ownership, MOD, involved amount: 12 billion]"). The first entity instance is the same as the first entity instance in the second group of instance data.

For example, the extraction module can process the to-be-processed text by using the extraction model, to obtain an annotation sequence and a relationship matrix of the to-be-processed text.

The annotation sequence is used to mark a word or a phrase in the to-be-processed text that is an entity instance and an entity type of the word or the phrase. The relationship matrix is used to mark a relationship description between any two words or phrases in the to-be-processed text.

In some implementations, the extraction model includes one or more of following models: BERT, Transformer, StanfordNLP, or LTP.

Figure 3:
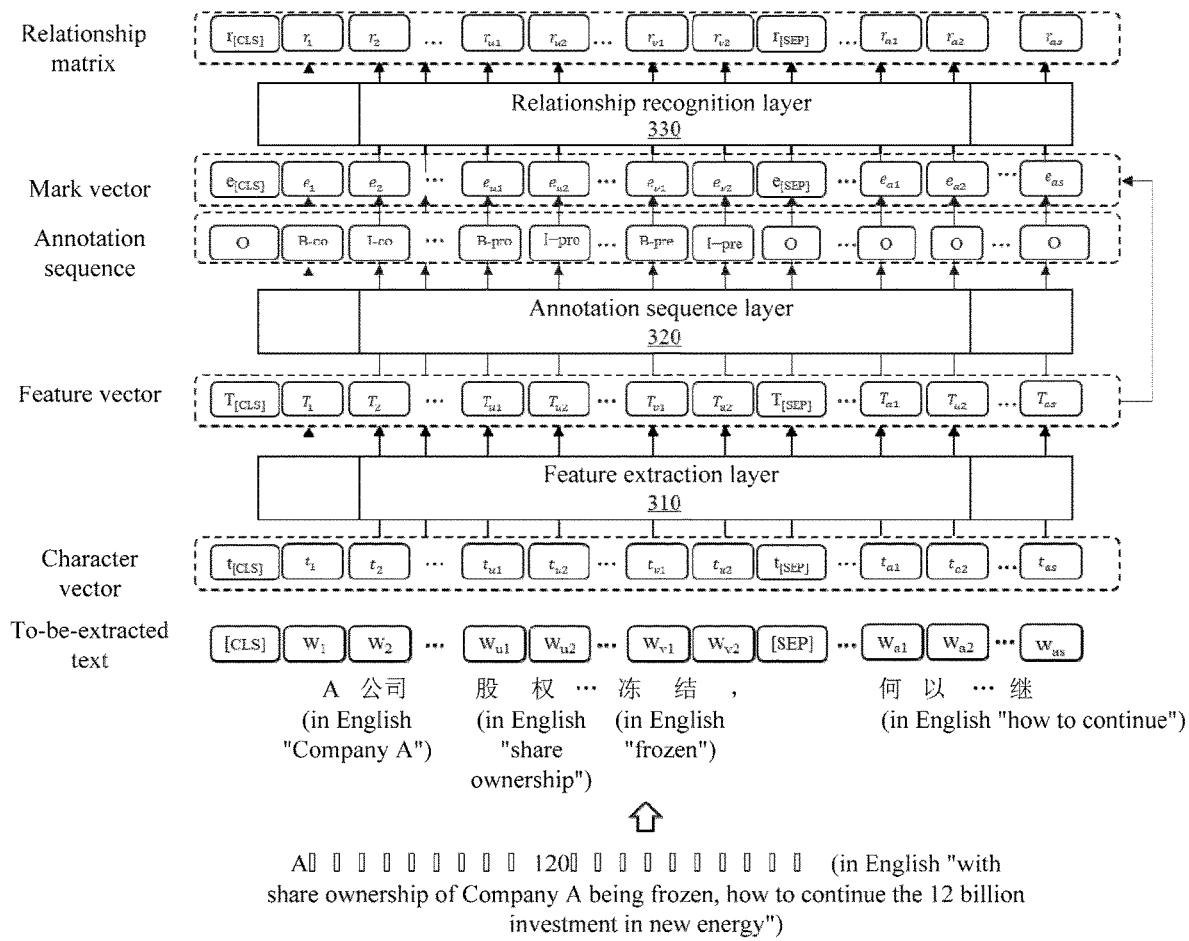
FIG. 3 is a schematic structural diagram illustrating an extraction model according to some implementations of this specification.

For detailed descriptions of the extraction model, references can be made to FIG. 3 and related description thereof. Details are omitted herein for simplicity.

The extraction module can determine an entity instance and an entity type of an entity instance in the to-be-processed text based on the annotation sequence.

As shown in FIG. 3, the extraction model processes "A 公司的股权被冻结，120 亿新 能源投资何以为继？" (in English "with share ownership of Company A being frozen, how to continue the 12 billion investment in new energy?"), to obtain an annotation sequence: "B-co", "I-co", . . . , "B-pro", "I-pro", . . . , "B-pre", "I-pre", . . . , "O", "O", "O", and "O". The extraction module can obtain corresponding entity instances of "A 公司" (in English "Company A"), "股权" (in English "share ownership"), and "冻结" (in English "frozen") and entity types of the entity instances of "corporate entity", "an asset", and "a verb of a preservation action" based on the entity annotation "B-co", "I-co", "B-pro", "I-pro", "B-pre", and "I-pre".

The extraction module can determine a relationship description between any two entity instances in the to-be-processed text based on the relationship matrix, and use the relationship description as a relationship description between two entity types corresponding to the two entity instances. As shown in FIG. 3, each word or each phrase in the to-be-processed text can correspond to a relationship vector r. A dimension of the relationship vector can be the same as a total number of words or a total number of phrases in the to-be-processed text. An element in the relationship vector reflects a relationship description between a word or a phrase corresponding to the vector and each other word or phrase in the to-be-processed text. The relationship vector can further include an element that reflects a relationship description between a word or a phrase corresponding to the relationship vector and the relationship vector. For example, an element value can be null by default. Relationship vectors of the plurality of words or phrases form the relationship matrix. It can be understood that the element in the relationship matrix can include the relationship descriptions such as VOB and MOD, or can include null. Herein, null indicates "invalid" or "empty". In some implementations, the extraction module can determine a relationship description between the two entity instances or two corresponding entity types based on a relationship description between respective initial words or initial phrases of the two entity instances.

As shown in FIG. 3, the extraction module can determine, based on an element that is in a relationship vector [$r_1$] corresponding to an initial word "A" in the entity instance "A 公司" (in English "Company A") and that corresponds to an initial word "股" (in English "share") in "股权" (in English "share ownership") in the entity instance in the relationship matrix, that a relationship description between "A 公司" (in English "Company A") and "股权" (in English "share ownership") is an attribute-object relationship. Further, the attribute-object relationship is used as a relationship description between the entity type "corporate entity" corresponding to "A 公司" (in English "Company A") and the entity type "an asset" corresponding to "股权" (in English "share ownership"). For another example, the extraction module can determine, based on an element that is in a relationship vector [$r_{v1}$] corresponding to an initial word "冻" (in English "frozen") in the entity instance "冻结" (in English "frozen") and that corresponds to an initial word "股" (in English "share") in "股权" (in English "share ownership") in the entity instance in the relationship matrix, that a relationship description between "冻结" (in English "frozen") and "股权" (in English "share ownership") is a verb-object relationship. Further, the verb-object relationship is used as a relationship description between the entity type "a verb of a preservation action" corresponding to "冻结" (in English "frozen" and the entity type "an asset" corresponding to "股权" (in English "share ownership"). For another example, in the relationship matrix, an element that is in a relationship vector [$r_{v1}$] corresponding to "冻" and that corresponds to "被" (in English "being") is null, and indicates that there is no explicit relationship between "冻" and "被" (in English "being").

Step 130: Determine one or more extracted triplets based on the one or more groups of instance data, to obtain an extracted graph.

For example, step 130 can be performed by the extracted graph acquisition module.

The extracted triplet is a set of three elements extracted from the instance data. In some implementations, the extracted triplet includes the first entity type, the second entity type, and the relationship description between the first entity type and the second entity type in the instance data.

For example, the extracted graph acquisition module can extract the first triplet [verb of a preservation action, VOB, asset] from the first group of instance data [verb of a preservation action: 冻结, asset: 股权] (in English "[verb of a preservation action: frozen, VOB, asset: share ownership]"), extract the second triplet [asset, SBV, verb of a preservation action] from the second group of instance data [asset: 股权, SBV, verb of a preservation action: 冻结] (in English "[asset: share ownership, SBV, verb of a preservation action: frozen]", extract the third triplet [asset, MOD, involved amount] from the third group of instance data [asset: 股权, MOD, involved amount: 120 亿] (in English "[asset: share ownership, MOD, involved amount: 12 billion]".

Further, the extracted graph acquisition module can construct the extracted graph based on the one or more extracted triplets.

The extracted graph is a network graph including a relationship description between an entity instance and an entity type in the one or more triplets. In some implementations, entity types in the one or more triplets in the extracted graph can be represented by a node, and a relationship description between the entity types in the one or more triplets can be represented by an edge connecting corresponding nodes.

For example, in the extracted graph, entity types "a verb of a preservation action" and "an asset" in the first triplet [verb of a preservation action, VOB, asset] can be respectively two nodes, and a relationship description "VOB" between "a verb of a preservation action" and "an asset" is an edge connecting the two nodes.

In some implementations, same entity types in a plurality of triplets can be represented by the same node in the extracted graph. For example, in response to that the entity type "an asset" in the third triplet [asset, MOD, involved amount] is the same as the entity type "an asset" in the first triplet [verb of a preservation action, VOB, asset], the entity type "an asset" in the third triplet and the entity type "an asset" in the first triplet can be represented by the same node in the extracted graph.

In some implementations, the edge in the extracted graph has a direction, and points from the first entity type to the second entity type. For example, an edge corresponding to the relationship description "VOB" in the first triplet points from "a verb of a preservation action" to "an asset". An edge corresponding to the relationship description "SBV" in the second triplet [asset, SBV, verb of a preservation action] points from "an asset" to "a verb of a preservation action".

Step 140: Obtain graph ontology definition data of one or more candidate events, and obtain an ontology definition graph corresponding to each candidate event based on the graph ontology definition data.

For example, step 140 can be performed by the ontology definition graph acquisition module.

The ontology definition graph is a graph including a series of entity instance types and a relationship description between the entity instance types. In some implementations, the entity instance type in the ontology definition graph can be represented by a node, and the relationship description between the entity instance types can be represented by an edge connecting nodes.

A plurality of candidate events can respectively correspond to a plurality of event types. For example, a first candidate event, a second candidate event, . . . , the $N^{th}$ candidate event can respectively correspond to an acquisition event type, a lawsuit losing event type, . . . , and a preservation event type.

In some implementations, each candidate event can correspond to one ontology definition graph. The ontology definition graph of the event can be generated based on graph ontology definition data of the event, for example, schema. The graph ontology definition data of the event can be manually formulated or written based on a general element of the event.

Figure 2:
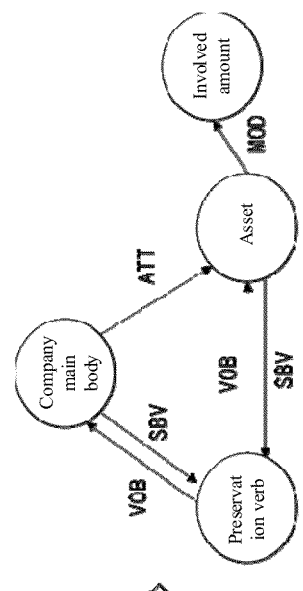
FIG. 2 is a schematic diagram illustrating graph ontology definition data of an event according to some implementations of this specification.

FIG. 2 is a schematic diagram illustrating graph ontology definition data of an event according to some implementations of this specification.

The graph ontology definition data is data for indicating the entity type included in the ontology definition graph and the relationship description between the entity types.

Correspondingly, each group of graph ontology definition data corresponds to one candidate event type. As shown in FIG. 2, acquisition-type graph ontology definition data, lawsuit losing-type graph ontology definition data, . . . , and preservation-type graph ontology definition data respectively correspond to the acquisition event type, the lawsuit losing event type, . . . , and the preservation event type.

In some implementations, the graph ontology definition data of the one or more events includes an entity type used to indicate an entity and a relationship description used to indicate a relationship between entity types.

In some implementations, for the entity type in the graph ontology definition data, an entity instance belonging to the entity type can be indicated by a word table or an extraction rule. It can be understood that an entity instance that satisfies the extraction rule belongs to a corresponding entity type. For example, an entity instance corresponding to an entity type of an enumeration type can be indicated by the word table. For example, the entity type "a verb of a preservation action" corresponds to a word table: "seize", "freeze", "attach", etc. For an entity type that cannot be enumerated, an entity instance can be indicated based on an extraction rule such as a regular expression, keyword matching, or a restricted data format. For example, for an entity type "law enforcement agency", the extraction rule can be indicated as performing text extraction through matching based on a keyword "court". For another example, for an entity type "involved amount", extraction can be performed based on a data format.

The graph ontology definition data can include the relationship description, and the relationship description and the entity type in the graph ontology definition data are combined by using the definition data, to indicate a relationship description between different entity types. In FIG. 2, the preservation-type graph definition data is used as an example. The preservation-type graph definition data includes six pieces of definition data. The first definition data specifies the first entity type "a verb of a preservation action", and the relationship description of the second entity type "corporate entity" is indicated as "VOB"; the second definition data specifies the first entity type "corporate entity", and the relationship description of the second entity type "a verb of a preservation action" is indicated as "ATT"; the third definition data specifies the first entity type "a verb of a preservation action", and the relationship description of the second entity type "an asset" is indicated as "VOB"; . . . , and the six definition data specifies the first entity type "an asset", and the relationship description of the second entity type "a verb of a preservation action" is indicated as "SBV".

The graph ontology definition data can be obtained based on a predetermined ontology definition data set. For example, the entity type and the relationship description in the graph ontology definition data of the events are determined from a predetermined ontology definition data set.

The predetermined ontology definition data set can be a set of an entity type and a relationship description that are formulated for a specific field, for example, the financial field or the education field. It can be considered that the ontology definition data set can include an entity type and a relationship description that correspond to a relatively comprehensive field, so that entity types and relationship descriptions of different events in the field can be found in the data set, or entity types and relationship descriptions in the data set can be universal. In response to that the graph ontology definition data is formulated for different events, the entity type and the relationship description can be selected from the data set, the entity type is further indicated by using a word table or an extraction rule, and the graph ontology definition data of the event can be obtained by specifying a relationship description between entity types by using the definition data.

In some implementations, the extraction model can be further trained based on the predetermined ontology definition data set, so that the entity instance and the relationship description of the entity instance that are extracted in step 120 are directly mapped onto an entity type and a relationship description in graph ontology definition data of a candidate event, to further improve subsequent graph matching accuracy. For detailed descriptions of the training extraction model, references can be made to FIG. 3 and related descriptions thereof. Details are omitted herein for simplicity.

In some implementations, the ontology definition graph acquisition module can further obtain an ontology definition graph of the one or more candidate events based on graph ontology definition data of the one or more candidate events.

For example, for the graph ontology definition data of each candidate event type, the first entity type and the second entity type in the graph ontology definition data can be used as nodes in an ontology definition graph of a corresponding candidate event type, and an edge is established for the corresponding nodes based on the definition data.

As shown in FIG. 2, the ontology definition graph acquisition module can use a first entity type "a verb of preservation action" and a second entity type "corporate entity" in graph ontology definition data of a preservation-type candidate event as two nodes in an ontology definition graph of the preservation-type candidate event, and establish an edge "VOB" between a node "a verb of a preservation action" and a node "corporate entity".

Similar to the extracted graph, an edge in the ontology definition graph of the candidate event has a direction, and points from the first entity type to the second entity type. The ontology definition graph corresponding to the preservation-type candidate event in FIG. 2 is still used as an example. The relationship description in the first definition data indicates that an edge corresponding to "VOB" points from "a verb of a preservation action" to "an asset". The relationship description in the second definition data indicates that an edge corresponding to "SBV" points from "an asset" to "a verb of a preservation action".

Similar to the extracted graph, same entity definitions in a plurality of pieces of definition data can be represented by using the same node in the ontology definition graph of the candidate event. For detailed descriptions, references can be made to step 130. Details are omitted herein for simplicity.

Similarly, the ontology definition graph acquisition module can obtain an ontology definition graph of an acquisition-type candidate event, a lawsuit losing-type ontology definition graph, etc.

Step 150: Determine a similarity between the extracted graph and each ontology definition graph of the one or more candidate events.

For example, step 150 can be performed by the similarity determining module.

In some implementations, the similarity determining module can process the extracted graph and the ontology definition graph of the candidate event by using a graph matching model, to obtain a similarity between the extracted graph and the ontology definition graph of the candidate event.

In some implementations, the graph matching model can include but is not limited to a graph matching network (GMN) model, a graph neural network (GNN) model, a graph convolutional neural network (GCN), a graph embedding model (GEM), and the like.

The GMN model is used as an example. The GMN model can obtain each node in the extracted graph and the ontology definition graph of the candidate event and an (initial) representation vector of each edge, obtain an attention size between each representation vector of the extracted graph and each representation vector of the ontology definition graph of the candidate event based on an attention mechanism, aggregate each node in the extracted graph and the ontology definition graph of the candidate event and the attention size between the representation vector of each edge and each representation vector, obtain cross-graph (cross-graph) information including the node, the edge, and an inter-relationship in the extracted graph and the ontology definition graph of the candidate event, and obtain the similarity based on the cross-graph information.

Figure 4:
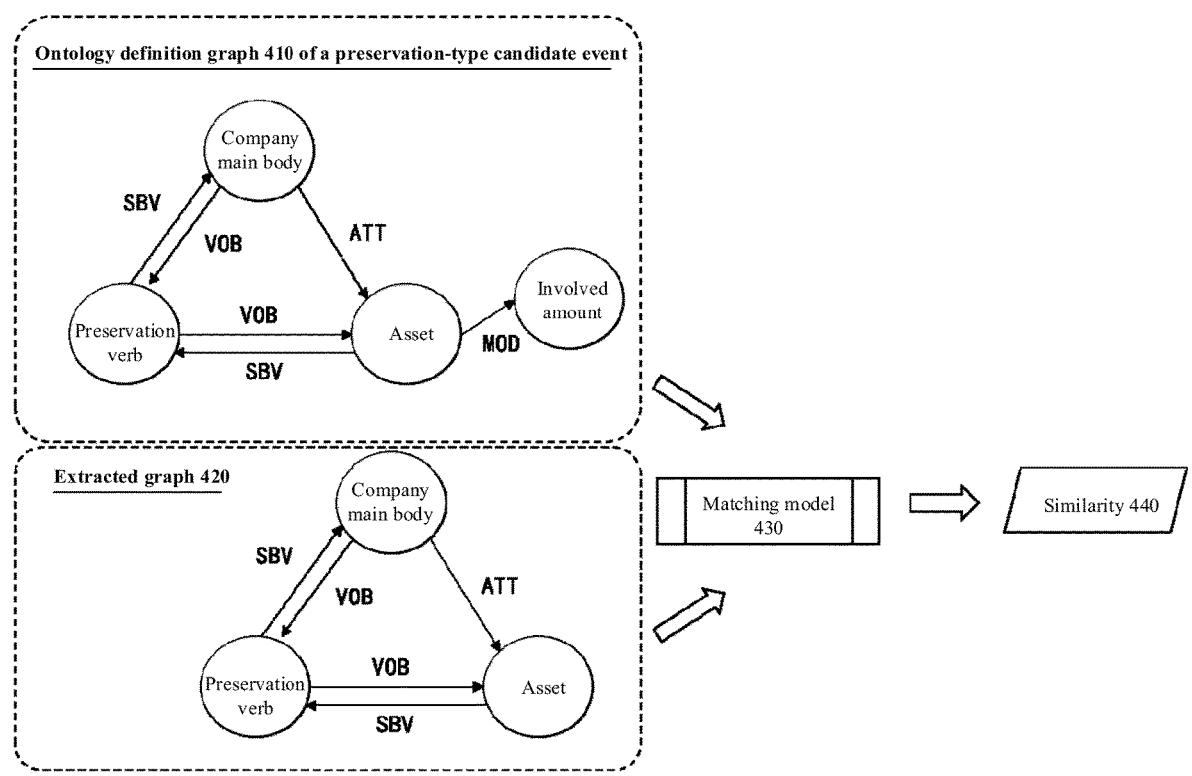
FIG. 4 is a schematic diagram illustrating determining of a similarity between an extracted graph and each ontology definition graph of one or more candidate events according to some implementations of this specification.

FIG. 4 is a schematic diagram illustrating determining of a similarity between an extracted graph and each ontology definition graph of one or more candidate events according to some implementations of this specification.

FIG. 4 is used as an example. The similarity determining module can obtain representation vectors N1, N2, N3, E1, E2, . . . corresponding to nodes such as "corporate entity", "a verb of a preservation action", "an asset", an edge "E (corporate entity, VOB, verb of a preservation action)", and an edge E (verb of a preservation action, SBV, verb of a preservation action)" in the extracted graph 420, and representation vectors n1, n2, n3, n4, e1, e2, . . . corresponding to nodes such as "corporate entity", "a verb of a preservation action", "an asset", an edge "E (corporate entity, VOB, verb of a preservation action)", and an edge "E (verb of a preservation action, SBV, verb of a preservation action)" in the ontology definition graph 410 of the preservation-type candidate event; obtain an attention size between N1 and each of n1, n2, n3, n4, e1, e2, . . . , and obtain an attention vector a1; and similarly, can obtain an attention size between N2 and each of n1, n2, n3, n4, e1, e2, and obtain an attention vector a2; . . . . Further, the GIVEN model (that is, the matching model 430) can aggregate each node of the extracted graph and representation vectors N1, N2, N3, E1, E2, . . . of each edge, each node of the ontology definition graph of the candidate event and representation vectors n1, n2, n3, n4, e1, e2 . . . of each edge, and attention vectors a1, a2, a3, . . . ; obtain the cross-graph information (cross-graph); and learn, based on the cross-graph information, that a similarity 440 between the extracted graph 420 and the ontology definition graph 410 of the preservation type candidate event is 0.8.

Similarly, the similarity determining module can obtain a similarity between the extracted graph 420 and each ontology definition graph of the acquisition-type candidate event, the ontology definition graph of the lawsuit losing-type candidate event.

In some implementations, the extracted graph and the ontology definition graph of the candidate event can be further processed based on the GEM or the GCN, to obtain vector representations of the two graphs, and then a similarity between the extracted graph and the ontology definition graph of the candidate event is determined by calculating a distance between two vector representations.

Step 160: Determine an event corresponding to the to-be-processed text from the one or more candidate events based on each similarity.

For example, step 160 can be performed by the event determining module.

In some implementations, the event determining module can determine a candidate event corresponding to a maximum value in a plurality of similarities, and use the candidate event as an event corresponding to the to-be-processed text.

For example, in response to that similarities between the extracted graph and each ontology definition graph of the preservation-type candidate event, the ontology definition graph of the acquisition-type candidate event, the ontology definition graph of a lawsuit losing-type candidate event are respectively 0.8, 0.5, 0.4, . . . , it is determined that the preservation-type event corresponding to the maximum similarity 0.8 is used as the event corresponding to the to-be-processed text.

In some implementations, the event determining module can be further configured to determine an event element in the to-be-processed text.

For example, the event detection system can determine one or more instance triplets based on the one or more groups of instance data. Each instance triplet includes the first entity instance, the second entity instance, and a relationship description between the first entity type and the second entity type respectively corresponding to the first entity instance and the second entity instance in the instance data. For example, the first instance triplet can include a to-be-extracted text in Chinese "A 公司的股权被冻结，120 亿新能源投资何以为继？ . . . " (in English "with share ownership of Company A being frozen, how to continue the 12 billion investment in new energy? . . . "), a first entity instance "冻结" (in English "frozen"), a second entity instance "股权" (in English "share ownership"), and a relationship description "VOB" between two entity types respectively corresponding to the first entity instance and the second entity instance in the corresponding first group of instance data [verb of a preservation action: 冻结, VOB, asset: 股权] "in English "[verb of a preservation action: frozen, VOB, asset: share ownership]". That is, the first instance triplet is [冻结, VOB, asset] "in English "[frozen, VOB, asset]". Similarly, the second instance triplet is [股权, SBV, 冻结] (in English "[share ownership, SBV, frozen]"), and the third instance triplet is [股权, MOD, 120 亿], . . . , [A 公司, ATT, 股权] (in English "[share ownership, MOD, 120 billion], . . . , [Company A, ATT, share ownership]").

Further, the event detection system can determine an event element of an event corresponding to the to-be-processed text based on the one or more instance triplets.

The event element includes a relationship between elements that forms an event. In some implementations, an instance entity of each instance triplet can be used as an element in an event, and the element in the event can be structurally expressed based on a relationship between elements.

For example, elements "冻结" (in English "frozen"), "MOD", "120 亿" (in English "12 billion"), "A 公司" (in English "Company A"), . . . are separately obtained based on the first instance triplet [冻结, VOB, asset] (in English "[frozen, VOB, asset]"), the second instance triplet [股权, SBV, 冻结] (in English "[share ownership, SBV, frozen]"), and the third instance triplet [股权, MOD, 120 亿] (in English "[share ownership, MOD, 12 billion]"), . . . , [A 公司, ATT, 股权] (in English "[Company A, ATT, share ownership]"), and then the elements are structurally expressed as "A 公司 股权冻结, 120 亿 . . . " (in English "with share ownership of Company A being frozen, . . . the 12 billion . . . "), to obtain an event element of the preservation-type event.

FIG. 3 is a schematic structural diagram illustrating an extraction model according to some implementations of this specification.

In some implementations, the extraction module can process the to-be-processed text by using the extraction model, to obtain an annotation sequence and a relationship matrix of the to-be-processed text.

As shown in FIG. 3, the extraction model 300 can include a feature extraction layer 310, an annotation sequence layer 320, and a relationship recognition layer 330.

For example, the feature extraction layer 310 can extract a feature vector of the to-be-processed text.

In some implementations, the feature extraction layer 310 can encode the to-be-processed text, to obtain a feature vector fused with information about the to-be-processed text.

In some implementations, before the feature extraction layer 310 encodes the to-be-processed text, the to-be-processed text can be processed as follows: adding [CLS] before the to-be-processed text; and separating all sentences in the to-be-processed text by a separator [SEP] for distinction. For example, the to-be-processed text in Chinese "A 公司的股权被冻结, 120 亿新能 源投资何以为继" (in English "with share ownership of Company A being frozen, how to continue the 12 billion investment in new energy?") is processed, to obtain "[CLS]A 公司的股权被冻结, [SEP] 120 亿新能源投资何以为继" (in English "[CLS] with share ownership of Company A being frozen, [SEP]how to continue the 12 billion investment in new energy?").

In some implementations, the feature extraction layer 310 can separately obtain a corresponding character vector and a corresponding position vector based on the to-be-processed text.

The character vector (token embedding) is a vector that represents character feature information of the to-be-processed text. As shown in FIG. 3, feature information of 22 characters $[w_1], [w_2], \ldots, [w_{a1}], [w_{a2}], \ldots,$ and $[w_{as}]$ included by the to-be-processed text in Chinese "A 公司的股权 被冻结, 120 亿新能源投资何以为继" (in English "with share ownership of Company A being frozen, how to continue the 12 billion investment in new energy") can be respectively represented by 22 character vectors $[t_1], [t_2], \ldots, [t_{a1}], [t_{a2}], \ldots,$ and $[t_{as}]$. For example, feature information of a character [A] can be represented by a character vector [2, 3, 3]. In an actual application scenario, a dimension represented by a vector can be higher. In some implementations, a character vector can be obtained by querying a word vector table or a word embedding model. In some implementations, the word embedding model can include but is not limited to a Word2vec model, a term frequency—inverse document frequency (TF-IDF) model, a skip-gram based combined-sentiment word embedding (SSWE-C) model, and the like.

A position vector (position embedding) is a vector that reflects a position of the character in the to-be-processed text, for example, indicates that the character is the first character or the second character in the to-be-processed text. In some implementations, the position vector of the to-be-processed text can be obtained through cosine/sine encoding. In some implementations, a segment vector (segment embedding) can be further included, and reflects a segment in which a character is located. For example, the character [A] is in the first sentence (segment) of the to-be-processed text.

Further, the feature extraction layer 310 can fuse, for example, splice or superpose, various types of vectors of the to-be-processed text, and then encode the fused vectors, to obtain the feature vector.

As shown in FIG. 3, the feature extraction layer 310 can obtain the feature vector $[T_1], [T_2], \ldots, [T_{a1}], [T_{a2}], \ldots,$ and $[T_{as}]$ based on the character vector $[t_1], [t_2], \ldots, [t_{a1}], [t_{a2}], \ldots,$ and $[t_{as}]$ and the position vector (not shown).

The example feature extraction layer can be implemented by a BERT model or a transformer.

Further, the annotation sequence layer 320 can obtain an annotation sequence based on the feature vector.

The annotation sequence is a result of sequentially sorting a plurality of annotations respectively corresponding to a plurality of words or a plurality of phrases in the to-be-processed text. In some implementations, the annotation can include an entity annotation, to indicate whether a corresponding word or phrase is an entity instance. Further, the entity annotation can be further divided into a corporate entity annotation and an asset entity annotation, to further indicate an entity type of the corresponding word or phrase. Therefore, the annotation sequence can be used to mark a word or a phrase in the to-be-processed text that is an entity instance and an entity type of the word or the phrase.

In some implementations, the entity annotation can be at least one of a Chinese character, a number, a letter, a symbol, and the like. For example, B can be used to represent an initial word or an initial phrase of the entity instance, and I can be used to represent a non-initial word or a non-initial phrase of the entity instance. For another example, the entity annotation B-co or I-co can mark a word or a phrase of an entity type "corporate entity" in the to-be-processed text. For another example, the entity annotation B-pro or I-pro can mark a word or a phrase of an entity type "an asset" in the to-be-processed text.

As shown in FIG. 3, the annotation sequence layer 320 can respectively mark entity instance "A 公司, 股权, 冻结, . . . " (in English "Company A, share ownership, frozen") in the to-be-processed text in Chinese "A 公司的股权被冻结, 120 亿新能源投资何以为继" (in English "with share ownership of Company A being frozen, how to continue the 12 billion investment in new energy") as "B-co, I-co, B-pro, I-pro, B-pre, I-pre, . . . " based on the feature vector $[T_1], [T_2], \ldots, [T_{a1}], [T_{a2}], \ldots,$ and $[T_{as}]$, to respectively represent "the first word of "corporate entity", a non-first word of "corporate entity", the first word of "an asset", a non-first word of "an asset", a first word of "a verb of a preservation action", and a non-first word of 'verb of a preservation action'".

In some implementations, the annotation can further include a non-entity annotation. The non-entity annotation can also be at least one of a Chinese character, a number, a letter, a symbol, and the like. A word or a phrase that is not an entity instance in the to-be-processed text can be marked with the same non-entity annotation. As shown in FIG. 3, the annotation sequence layer 320 uses four words "O" to mark the phrase "何以为继" (in English "how to continue") that is not an entity instance in the to-be-processed text. In some implementations, a word or a phrase that is not an entity instance in the to-be-processed text can be marked with no annotation.

For example, the annotation sequence layer 320 can obtain, based on the feature vector, a probability that each word or each phrase in the to-be-processed text is a different entity type and a probability that each word or each phrase is not any entity, and then use, as an annotation of the word or the phrase, an entity annotation of an entity type corresponding to a maximum value of the probability or a non-entity annotation that is not an entity.

FIG. 3 is used as an example. The annotation sequence layer 320 can learn, based on the feature vector $[T_1]$, that a probability that "A" is the first word of "corporate entity" is 0.8, a probability that "A" is the non-first word of "corporate entity" is 0.5, a probability that "A" is the first word of "person" is 0.3, a probability that "A" is the non-first word of "person" is 0.3, a probability that "A" is a first word of a freeze verb is . . . , and a probability that "A" is not an entity is 0.2; and use an entity annotation "B-co" of a first word of "corporate entity" corresponding to a maximum value 0.8 of the probability as an entity annotation of the word "A".

Similarly, the annotation sequence layer 320 can obtain an annotation (entity annotation or non-entity annotation) of each word or each phrase in the to-be-processed text in Chinese "A 公司 的股权被冻结 ，120 亿新能源投资何以为继" (in English "with share ownership of Company A being frozen, how to continue the 12 billion investment in new energy"), and sort the words or phrases in a sequence of the words or phrases in the to-be-processed text, thereby obtaining an annotation sequence: "B-co", "I-co", . . . , "B-pro", "I-pro", . . . , "B-pre", "I-pre", . . . , "O", "O", "O", and "O".

In some implementations, the annotation sequence layer 320 can include but is not limited to one or more of an N-Gram (N-Gram) model, a conditional random fields (CRF) model, and a hidden markov model (HMM).

Further, the relationship recognition layer 330 can obtain a relationship matrix based on the feature vector and the annotation sequence.

The relationship matrix can be used to mark a relationship description between any two words or phrases in the to-be-processed text. In some implementations, each element in the relationship matrix can mark a relationship description between two words or phrases. A dimension of the relationship matrix is determined based on a number of characters of the to-be-processed text. For example, in response to that the to-be-processed text includes N words or phrases, the dimension of the relationship matrix is N×N. A vector of each column 1×N in the relationship matrix can mark a relationship description between one word or each phrase in the to-be-processed text and all the remaining words or phrases, and a vector of N columns 1×N can respectively mark a relationship description between N words or phrases in the to-be-processed text and all the remaining words or phrases.

In some implementations, the relationship recognition layer 330 can first embed each annotation in the annotation sequence into a corresponding feature vector by using a word embedding network, to obtain a label vector.

As shown in FIG. 3, the relationship recognition layer 330 can first respectively embed annotations "B-co", "I-co", . . . , "B-pro", "I-pro", . . . , "B-pre", "I-pre", . . . , "O", "O", "O", and "O" in the annotation sequence into the feature vectors $[T_1], [T_2], \ldots, [T_{a1}], [T_{a2}], \ldots,$ and $[T_{as}]$, to obtain mark vectors $[e_1], [e_2], \ldots, [e_{a1}], [e_{a2}], \ldots,$ and $[e_{as}]$.

Further, the relationship recognition layer 330 can obtain a relationship matrix by using a Multi-sigmoid layer (Multi-sigmoid layer) based on the mark vector. For more content of the relationship matrix, references can be made to the related descriptions of step 120.

The above implementation provides an implementation structure of the extraction model. In still some other implementations, the extraction model can be implemented based on an end-to-end model, for example, a BERT-based multi-head selection model, a Stanford Chinese grammar analysis tool StanfordNLP, or a Hutchison Chinese language analysis tool LTP.

In some implementations, the extraction model can be obtained through training based on a training sample. For example, a training sample with a label is input into the extraction model, and a parameter of the extraction model is updated through training.

In some implementations, the label of the training sample can be determined based on the entity type and the relationship description in the predetermined ontology definition data set. The above example is still used. A label of the training sample "X 公司股权被冻结" (in English "with share ownership of Company X being frozen") can include a known annotation sequence and a known relationship matrix of the training sample. The known annotation sequence indicates that entity types corresponding to "X 公司" (in English "Company X", "股权" (in English "share ownership", and "冻结" (in English "frozen" are respectively entity types "corporate entity", "an asset", and "a verb of a preservation action" in the predetermined ontology definition data set, and the known relationship matrix indicates a relationship description "ATT" between "corporate entity" and "an asset", a relationship description "SBV" between "an asset" and "a verb of a preservation action", etc.

Further, the training sample is processed by using the extraction model, to obtain the annotation sequence and the relationship matrix predicted by the model, and a parameter of the extraction model is adjusted with reference to the known annotation sequence and the known relationship matrix, to reduce a difference between a prediction result and a known label.

For detailed descriptions of the predetermined ontology definition data set, references can be made to step 140. Details are omitted herein for simplicity.

An implementation of this specification further provides a computer-readable storage medium. The storage medium stores computer instructions, and after a computer reads the computer instructions in the storage medium, the computer implements the event detection method.

An implementation of this specification provides an event detection apparatus. The apparatus includes at least one processor and at least one memory, the at least one memory is configured to store computer instructions, and the at least one processor is configured to execute at least some instructions in the computer instructions, to implement an event detection method.

Beneficial effects that may be brought by the implementations of this specification include but are not limited to: (1) An event or an event element is detected based on event graph ontology definition data. For a newly emerging event, compatibility can be detected only at relatively low costs. (2)

The extraction model is trained based on the predetermined ontology definition data set, so that the extraction model can map the instance data in the to-be-extracted text onto the entity type and the relationship description in the event graph ontology definition data, thereby improving subsequent graph matching accuracy. (3) The relationship description between entity types is further abstracted and summarized, to improve compatibility of new event detection.

It should be noted that different beneficial effects may be generated in different implementations. In different implementations, a beneficial effect that may be generated may be any one of or a combination of several of the foregoing beneficial effect, or may be any other beneficial effect that may be obtained.

Basic concepts have been described above. Clearly, for a person skilled in the art, the foregoing detailed disclosure is merely an example, but does not constitute a limitation on the specification. Although not explicitly stated herein, a person skilled in the art may make various modifications, improvements, and amendments to this specification. Such modifications, improvements, and amendments are proposed in this specification. Therefore, such modifications, improvements, and amendments still fall within the spirit and scope of the example implementations of this specification.

In addition, specific words are used in this specification to describe the implementations of this specification. For example, "one implementation", "an implementation", and/or "some implementations" mean a feature, structure, or characteristic related to at least one implementation of this specification. Therefore, it should be emphasized and noted that "an implementation", "one implementation" or "an alternative implementation" mentioned twice or more times in different positions in this specification does not necessarily refer to the same implementation. In addition, some features, structures, or characteristics in one or more implementations of this specification may be appropriately combined.

In addition, a person skilled in the art can understand that aspects of this specification can be illustrated and described by using several patentable categories or cases, including any new and useful combination of processes, machines, products or substances, or any new and useful improvement thereof. Correspondingly, aspects of this specification can be completely executed by hardware, completely executed by software (including firmware, resident software, microcode, and the like), or can be executed by a combination of hardware and software. The hardware or software can be referred to as "data block", "module", "engine", "unit", "component", or "system". In addition, aspects of this specification can be represented by a computer product located in one or more computer-readable media, and the product includes computer-readable program code.

The computer storage medium can include a propagated data signal that includes computer program code, for example, on a baseband or as part of a carrier. The propagated signal can have a plurality of representation forms, including an electromagnetic form, an optical form, or the like, or a proper combination form. The computer storage medium can be any computer-readable medium other than a computer-readable storage medium, and the medium can be connected to an instruction execution system, apparatus, or device to implement a program to be used for communication, propagation, or transmission. Program code located on the computer storage medium can be propagated through any proper medium, including radio, a cable, a fiber optic cable, RF, or the like, or any combination thereof.

Computer program code needed for the various operations of this specification can be written in any one or more programming languages, including object-oriented programming languages such as Java, Scala, Smalltalk, Eiffel, JADE, Emerald, C++, C#, VB, NET, and Python, conventional programming languages such as C, Visual Basic, Fortran2003, Perl, COBOL 2002, PHP, and ABAP, dynamic programming languages such as Python, Ruby, and Groovy, or other programming languages. The program code can completely run on a user computer, or as an independent software package on a user computer, or partially on a user computer and partially on a remote computer, or completely on a remote computer or server. In the latter case, the remote computer can be connected to a user computer in any network form, for example, a local area network (LAN) or a wide area network (WAN), or connected to an external computer (for example, through the Internet), or in a cloud computing environment, or used as a service, for example, a software as a service (SaaS).

In addition, unless explicitly stated in the claims, the order of the processing elements and sequences, the use of numbers and letters, or the use of other names described in this specification is not intended to limit the order of the procedures and methods described in this specification. Although some currently considered useful implementations of the invention are discussed in various examples in the foregoing disclosure, it should be understood that such details are merely used for illustrative purposes. The appended claims are not limited to the disclosed implementations, and instead, the claims are intended to cover all amendments and equivalent combinations that conform to the essence and scope of the implementations of this specification. For example, although the system components described above may be implemented by a hardware device, the system components may also be implemented only by a software solution, for example, installing the described system on an existing processing device or mobile device.

It should be noted that, to simplify the description disclosed in this specification to help understand one or more implementations of the present invention, in the foregoing description of the implementations of this specification, a plurality of features are sometimes incorporated into one implementation or accompanying drawing or descriptions thereof.

Numbers describing the composition and attributes are used in some implementations. It should be understood that such numbers used for the description of the implementations are modified in some examples by modifiers such as "about", "approximately", or "generally". Unless otherwise stated, "about", "approximately", or "generally" indicates that the number allows a change in ±20%. Correspondingly, in some implementations, numeric parameters used in this specification and claims are approximations, and the approximations may change based on features required by some implementations. In some implementations, the numeric parameters should take into account the specified significant digits and use a general digit retention method. Although in some implementations of this specification, numeric domains and parameters used to determine the ranges of the implementations are approximations, in specific implementations, such values are set as precisely as possible in a feasible range.

Each patent, patent application, and patent application publication, and other materials, such as articles, books, instructions, publications, documents, etc. that are referenced by this specification are incorporated into this specification herein by reference in its entirety, except for the application history documents that are inconsistent with or conflict with the content of this specification, and the documents limiting a widest scope of the claims of this specification (the documents currently or later attached to this specification). It should be noted that, in response to that the description, definition, and/or use of a term in the auxiliary material of this specification is inconsistent or conflicts with the content of this specification, the description, definition, and/or use of the term in this specification shall prevail.

Finally, it should be understood that the implementations described in this specification are merely used to describe the principles of the implementations of this specification. Other variations may all fall within the scope of this specification. Therefore, as an example rather than a limitation, alternative configurations of the implementations of this specification may be considered to be consistent with the teachings of this specification. Correspondingly, the implementations of this specification are not limited to the implementations explicitly introduced and described in this specification.

What is claimed is:

1. An event detection method, the method comprising:
    obtaining a to-be-processed text;
    extracting one or more groups of instance data from the to-be-processed text by using an extraction model, each group of instance data including a first entity instance, a first entity type corresponding to the first entity instance, a second entity instance, a second entity type corresponding to the second entity instance, and a relationship description between the first entity type and the second entity type;
    determining one or more extracted triplets based on the one or more groups of instance data, to obtain an extracted graph, an extracted triplet including the first entity type, the second entity type, and the relationship description between the first entity type and the second entity type in the instance data;
    obtaining graph ontology definition data of one or more candidate events, and obtaining an ontology definition graph corresponding to each candidate event based on the graph ontology definition data, the graph ontology definition data of the one or more candidate events including an entity type used to indicate an entity and a relationship description used to indicate a relationship between entity types;
    determining a similarity between the extracted graph and each ontology definition graph of the one or more candidate events; and
    determining an event corresponding to the to-be-processed text from the one or more candidate events based on each similarity.

2. The method according to claim 1, further comprising:
    determining the graph ontology definition data of events, wherein entity type and relationship description of the graph ontology definition data of the events are determined from an ontology definition data set.

3. The method according to claim 2, wherein the extraction model is obtained through training based on a training sample, and a label of the training sample is determined based on entity type and relationship description in the ontology definition data set.

4. The method according to claim 1, wherein the relationship description includes one or more of: a verb-object relationship, a subject-verb relationship, an attribute-object relationship, or a modifying relationship.

5. The method according to claim 1, wherein the extracting the one or more groups of instance data from the to-be-processed text by using the extraction model includes:
    processing the to-be-processed text by using the extraction model, to obtain an annotation sequence and a relationship matrix of the to-be-processed text;
    determining an entity instance and an entity type of an entity instance in the to-be-processed text based on the annotation sequence; and
    determining a relationship description between two entity instances in the to-be-processed text based on the relationship matrix, and using the relationship description as a relationship description between entity types corresponding to the two entity instances.

6. The method according to claim 5, wherein the annotation sequence is used to mark a word or a phrase in the to-be-processed text that is an entity instance and an entity type of the word or the phrase, and the relationship matrix is used to mark a relationship description between two of words or phrases in the to-be-processed text.

7. The method according to claim 1, wherein the extraction model includes one or more of: BERT, Transformer, StanfordNLP, or LTP.

8. The method according to claim 1, wherein the determining the similarity between the extracted graph and each ontology definition graph of the one or more candidate events includes:
    for an ontology definition graph of a candidate event,
        processing the extracted graph and the ontology definition graph of the candidate event by using a graph matching model, to obtain a similarity between the extracted graph and the ontology definition graph of the candidate event.

9. The method according to claim 1, further comprising:
    determining an event element of an event corresponding to the to-be-processed text based on the one or more instance triplets.

10. A computer system comprising at least one processor and at least one memory, the at least one memory, individually or collectively, having computer executable instructions stored thereon, which when executed by the at least one processor, enabling the at least one processor to, individually or collectively, implement acts including:
    obtaining a to-be-processed text;
    extracting one or more groups of instance data from the to-be-processed text by using an extraction model, each group of instance data including a first entity instance, a first entity type corresponding to the first entity instance, a second entity instance, a second entity type corresponding to the second entity instance, and a relationship description between the first entity type and the second entity type;
    determining one or more extracted triplets based on the one or more groups of instance data, to obtain an extracted graph, an extracted triplet including the first entity type, the second entity type, and the relationship description between the first entity type and the second entity type in the instance data;
    obtaining graph ontology definition data of one or more candidate events, and obtaining an ontology definition graph corresponding to each candidate event based on the graph ontology definition data, the graph ontology definition data of the one or more candidate events including an entity type used to indicate an entity and a relationship description used to indicate a relationship between entity types;

determining a similarity between the extracted graph and each ontology definition graph of the one or more candidate events; and determining an event corresponding to the to-be-processed text from the one or more candidate events based on each similarity.

11. The computer system according to claim 10, wherein the acts further include:

determining the graph ontology definition data of events, wherein entity type and relationship description of the graph ontology definition data of the events are determined from an ontology definition data set.

12. The computer system according to claim 11, wherein the extraction model is obtained through training based on a training sample, and a label of the training sample is determined based on entity type and relationship description in the ontology definition data set.

13. The computer system according to claim 10, wherein the relationship description includes one or more of: a verb-object relationship, a subject-verb relationship, an attribute-object relationship, or a modifying relationship.

14. The computer system according to claim 10, wherein the extracting the one or more groups of instance data from the to-be-processed text by using the extraction model includes:

processing the to-be-processed text by using the extraction model, to obtain an annotation sequence and a relationship matrix of the to-be-processed text;

determining an entity instance and an entity type of an entity instance in the to-be-processed text based on the annotation sequence; and determining a relationship description between two entity instances in the to-be-processed text based on the relationship matrix, and using the relationship description as a relationship description between entity types corresponding to the two entity instances.

15. The computer system according to claim 14, wherein the annotation sequence is used to mark a word or a phrase in the to-be-processed text that is an entity instance and an entity type of the word or the phrase, and the relationship matrix is used to mark a relationship description between two of words or phrases in the to-be-processed text.

16. The computer system according to claim 10, wherein the extraction model includes one or more of: BERT, Transformer, StanfordNLP, or LTP.

17. The computer system according to claim 10, wherein the determining the similarity between the extracted graph and each ontology definition graph of the one or more candidate events includes:

for an ontology definition graph of a candidate event, processing the extracted graph and the ontology definition graph of the candidate event by using a graph matching model, to obtain a similarity between the extracted graph and the ontology definition graph of the candidate event.

18. The computer system according to claim 10, wherein the acts further include:

determining an event element of an event corresponding to the to-be-processed text based on the one or more instance triplets.

19. A non-transitory storage medium having computer executable instructions stored thereon, the computer executable instructions when executed by one or more processors, enabling the one or more processors to, individually or collectively, implement acts comprising:

obtaining a to-be-processed text;

extracting one or more groups of instance data from the to-be-processed text by using an extraction model, each group of instance data including a first entity instance, a first entity type corresponding to the first entity instance, a second entity instance, a second entity type corresponding to the second entity instance, and a relationship description between the first entity type and the second entity type;

determining one or more extracted triplets based on the one or more groups of instance data, to obtain an extracted graph, an extracted triplet including the first entity type, the second entity type, and the relationship description between the first entity type and the second entity type in the instance data;

obtaining graph ontology definition data of one or more candidate events, and obtaining an ontology definition graph corresponding to each candidate event based on the graph ontology definition data, the graph ontology definition data of the one or more candidate events including an entity type used to indicate an entity and a relationship description used to indicate a relationship between entity types;

determining a similarity between the extracted graph and each ontology definition graph of the one or more candidate events; and determining an event corresponding to the to-be-processed text from the one or more candidate events based on each similarity.

20. The non-transitory storage medium according to claim 19, wherein the extraction model is obtained through training based on a training sample, and a label of the training sample is determined based on entity type and relationship description in the ontology definition data set.

* * * * *